(12) United States Patent
Guo et al.

(10) Patent No.: US 11,692,460 B2
(45) Date of Patent: Jul. 4, 2023

(54) CONNECTOR AND AN ANTI THERMAL MISMATCH CONNECTING DEVICE

(71) Applicant: AECC COMMERCIAL AIRCRAFT ENGINE CO., LTD., Shanghai (CN)

(72) Inventors: Hongbao Guo, Shanghai (CN); Kaiyuan Li, Shanghai (CN); Zhiliang Hong, Shanghai (CN)

(73) Assignee: AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 162 days.

(21) Appl. No.: 17/432,638

(22) PCT Filed: Nov. 27, 2020

(86) PCT No.: PCT/CN2020/132059
§ 371 (c)(1),
(2) Date: Aug. 20, 2021

(87) PCT Pub. No.: WO2021/227443
PCT Pub. Date: Nov. 18, 2021

(65) Prior Publication Data
US 2022/0341348 A1 Oct. 27, 2022

(30) Foreign Application Priority Data
May 11, 2020 (CN) .......................... 202010392432.7

(51) Int. Cl.
*F01D 11/08* (2006.01)
*F16B 19/02* (2006.01)
(Continued)

(52) U.S. Cl.
CPC ........... *F01D 25/246* (2013.01); *F01D 25/28* (2013.01); *F16B 19/02* (2013.01);
(Continued)

(58) Field of Classification Search
CPC ........ F01D 11/08; F01D 25/24; F01D 25/243; F01D 25/246; F01D 25/28;
(Continued)

(56) References Cited

U.S. PATENT DOCUMENTS 7,416,362 B2 *  8/2008  North .................... F16B 5/0241
                                                       403/30
10,619,514 B2    4/2020  Walston et al.
(Continued)

FOREIGN PATENT DOCUMENTS

CN    203822819 U    9/2014
CN    204553493 U    8/2015
(Continued)

OTHER PUBLICATIONS

Office Action dated Nov. 14, 2022, in corresponding Canadian Application No. 3126790, 4 pages.
(Continued)

*Primary Examiner* — Eldon T Brockman
*Assistant Examiner* — Maxime M Adjagbe
(74) *Attorney, Agent, or Firm* — Maier & Maier, PLLC

(57) ABSTRACT

In order to alleviate a mismatch problem of thermal deformation, in all directions, of a connecting and installing structure between a CMC turbine outer annular component and a metal intermediate casing, a connector and an anti thermal mismatch connecting device are provided. The rod part of the connector comprises a subtractive hollow section and a cylindrical section. The subtractive hollow section is composed of a central shaft, a plurality of supporting rib plates extending outwards from a peripheral surface of the central shaft and inclined radially relative to the central shaft, and a plurality of outer annular plates arranged around the central shaft, with a circumferential gap between adjacent outer annular plates. The supporting rib plate is con-
(Continued)

nected with the central shaft and the outer annular plate, and the central shaft is connected with the cylindrical section. The anti thermal mismatch connecting device the connector.

8 Claims, 3 Drawing Sheets

(51) Int. Cl.
   *F01D 25/24* (2006.01)
   *F01D 25/28* (2006.01)
(52) U.S. Cl.
   CPC .... *F05D 2240/14* (2013.01); *F05D 2250/231* (2013.01); *F05D 2250/711* (2013.01); *F05D 2260/36* (2013.01); *F05D 2300/6033* (2013.01)
(58) Field of Classification Search
   CPC ............ F05D 2240/11; F05D 2230/64; Y10T 403/32819; Y10T 403/32827; Y10T 403/32861; Y10T 403/32868; Y10T 403/32; Y10T 403/32885; Y10T 403/32918; Y10T 403/32951; F16B 19/02
   See application file for complete search history.

(56) References Cited

U.S. PATENT DOCUMENTS

2016/0348528 A1* 12/2016 Vetters ...................... F01D 9/04
2019/0112947 A1*  4/2019 Walston ................ F01D 25/246
2021/0164365 A1*  6/2021 Starr ....................... F01D 11/08
2021/0189897 A1*  6/2021 Sippel ..................... F01D 11/08

FOREIGN PATENT DOCUMENTS

CN    108699918 A    10/2018
EP      3379039 A1     9/2018

OTHER PUBLICATIONS

Office Action dated Oct. 18, 2022, in corresponding Japanese Application No. 2021-548214, 9 pages.
European Patent Office Search Report, dated Aug. 8, 2022, in corresponding European Patent Application No. 20924980.4; 9 pages.
Russian Paten Office Search Report, dated May 24, 2022, in corresponding Russian Patent Application No. 202010392432.7; 4 pages.
International Search Report and Written Opinion dated Mar. 9, 2021 in corresponding International application No. PCT/CN2020/132059; 18 pgs.

* cited by examiner

CONNECTOR AND AN ANTI THERMAL MISMATCH CONNECTING DEVICE

TECHNICAL FIELD

This disclosure relates to the field of turbine outer annular component of turbine aeroengine, in particular to a connector with a subtractive hollow section, and an anti thermal mismatch connecting device.

BACKGROUND

As a main turbine stationary part of gas turbine engine, turbine outer annular component bears high ambient temperature in service. At present, turbine outer annular component is mainly made of superalloy materials. However, the strength and stiffness of superalloy materials will decrease significantly under high temperature environment, which will affect the upper limit of service temperature of the turbine outer annular component, and ultimately limit the improvement of overall performance of gas turbine engine. Using ceramic matrix composites (CMC) instead of superalloys to produce the turbine outer annular component of gas turbine engine can give full play to the characteristics of CMC, such as low density, excellent high temperature mechanical properties and good thermal stability, thereby improving the upper limit of service temperature of the turbine outer annular component, and reducing the amount of related cooling gas, which plays an important role in significantly improving the overall efficiency of gas turbine engine and reducing pollution emissions. However, since thermal expansion coefficient of metal material is greater than that of ceramic matrix composite, the thermal expansion of a CMC turbine outer annular component in a temperature change process, is different from that of a metal pin and a metal intermediate casing component. The thermal deformation difference between them will cause a significant thermal deformation mismatch in the above-mentioned connecting and installing structure. For example, when installing at room temperature, in order to avoid vibration and collision between a metal pin and a CMC connecting hole, it is required to carry out a close fit installation, and no fit gap is reserved between the two. However, the radial expansion of the metal pin is larger than that of the CMC connecting hole during a heating process, and the thermal deformation mismatch of the two will lead to high contact stress between the contact surfaces of the two, which will lead to a strength failure of the CMC structure.

SUMMARY

The purpose of the disclosure is to provide a connector which can prevent the mismatch problem of thermal deformation between connected parts.

Another purpose of the disclosure is to provide an anti thermal mismatch connecting device.

The connector to achieve the purpose has a rod part. The rod part of the connector comprises a subtractive hollow section and a cylindrical section. The subtractive hollow section comprises a central shaft, a plurality of supporting rib plates, extending outwards from a peripheral surface of the central shaft and inclined radially relative to the central shaft, and a plurality of outer annular plates, arranged around the central shaft. A circumferential gap is provided between adjacent outer annular plates. The supporting rib plate is connected with the central shaft and the outer annular plate, and the central shaft is connected with the cylindrical section.

In one or more embodiments of the connector, the plurality of the supporting rib plates are arranged in a rotationally symmetric form along the central shaft.

In one or more embodiments of the connector, the central shaft and the cylindrical section are connected or welded by a threaded connection structure.

In one or more embodiments of the connector, outer surfaces of the plurality of the outer annular plates are located on a same cylindrical surface, and the cylindrical surface is located in an axial extension direction of an outer surface of the cylindrical section.

The connecting device for the purpose of providing thermal mismatch protection, comprising the connector; a CMC turbine outer annular component, with an outer convex annular rib plate at an outer circumference; and a metal intermediate casing, with an inner convex annular rib plate at an inner circumference. The outer convex annular rib plate has a CMC connecting hole, and the inner convex annular rib plate has a metal connecting hole. A cylindrical section of the connector is matched with the metal connecting hole of the inner convex annular rib plate. The subtractive hollow section of the connector is inserted into the CMC connecting hole, and the plurality of the outer annular plates are matched with the CMC connecting hole in a close contact, to generate an installation preload on the supporting rib plate.

In one or more embodiments of the anti thermal mismatch connecting device, the metal intermediate casing provides two limit rings. The CMC turbine outer annular component provides two outer convex annular rib plates. The two outer convex annular rib plates are located between the two limit rings, and outer edges of the two outer convex annular rib plates are respectively abutted on the adjacent limit ring.

In one or more embodiments of the anti thermal mismatch connecting device, the metal intermediate casing provides three inner convex annular rib plates. The two outer convex annular rib plates and the three inner convex annular rib plates are staggered along an axial direction of an engine, to make any one of the two outer convex annular rib plates located between two inner convex annular rib plates.

In one or more embodiments of the anti thermal mismatch connecting device, the metal intermediate casing provides a plurality of the inner convex annular rib plates. The metal connecting holes of the plurality of the inner convex annular rib plates, which are matched with one of the connector, are round holes, and rest of the metal connecting holes are runway shaped connecting holes.

The disclosure has the following beneficial effects:

When matched and contacted with the CMC connecting holes, an outer surface of the subtractive hollow section on the connector has a small radial deformation stiffness and is prone to radial elastic deformation. This will allow the outer surface of the subtractive hollow section to expand and deform, under the restriction of the inner circumference surface of the CMC connecting holes, during a heating process, and there will be no great contact stress between the two. Therefore, the thermal deformation mismatch between the two can be alleviated, and the strength failure of the structure can be avoided. A group of round holes, as well as a plurality of groups of runway shaped connecting holes, are designed and processed on the metal intermediate casing. The round holes are used to fit closely with one connector to ensure the accurate installation and positioning of CMC turbine outer annular component. The runway shaped connecting holes allow the connector fit with them to slide along a specified direction, so as to solve the mismatch problem of thermal deformation, between the connector which is completely limited and fixed by the CMC connecting holes, and the metal connecting holes on the metal intermediate casing.

By designing the connector with the subtractive hollow section and the anti thermal mismatch connecting device, an accurate installation and positioning between the CMC turbine outer annular component and the metal intermediate casing of the turbine engine is realized, and the vibration and collision can be avoided. Meanwhile, under the change of ambient temperature, the thermal deformation mismatch between the CMC turbine outer annular component, the metal intermediate casing and the connector is alleviated, the problem of structural strength failure or the functional failure due to structural relaxation is avoided. Meanwhile, the CMC turbine outer annular component is also ensured to have enough installation stiffness to meet the design needs. The simplicity of the connection and installation structure is beneficial to significantly reduce the technical and operational difficulties of the CMC turbine outer annular component in the aspects of production, subsequent processing and installation.

BRIEF DESCRIPTION OF THE DRAWINGS

The above and other features, properties and advantages of the disclosure will become more apparent by the following description in combination with the drawings and the embodiments, wherein.

wherein 1 is a CMC turbine outer annular component; 2 is a connector; 3 is a metal intermediate casing; 11 is a CMC connecting hole; 12 is an outer convex annular rib plate; 13 is an inner convex annular rib plate; 21 is a subtractive hollow section; 22 is a cylindrical section; 23 is a cap part; 24 is rod part; 31 is a metal connecting hole; 32 is a limit ring; 211 is a central shaft; 212 is a supporting rib plate; 213 is an outer annular plate; 214 is a circumferential gap; 311 is a round hole; 312 is a runway shaped connecting hole.

DETAILED DESCRIPTION OF EMBODIMENTS

The disclosure will be further described in combination with some specific embodiments and drawings, so that those skilled in the art can better understand the disclosure and implement it. However, the described embodiments are not taken as a limitation of the disclosure.

Figure 1:
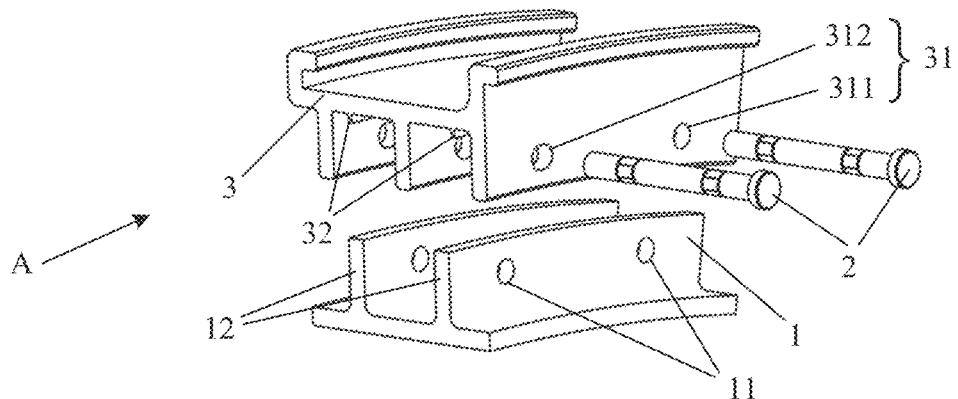
FIG. 1 is a decomposition diagram of the anti thermal mismatch connecting device.
Figure 2:
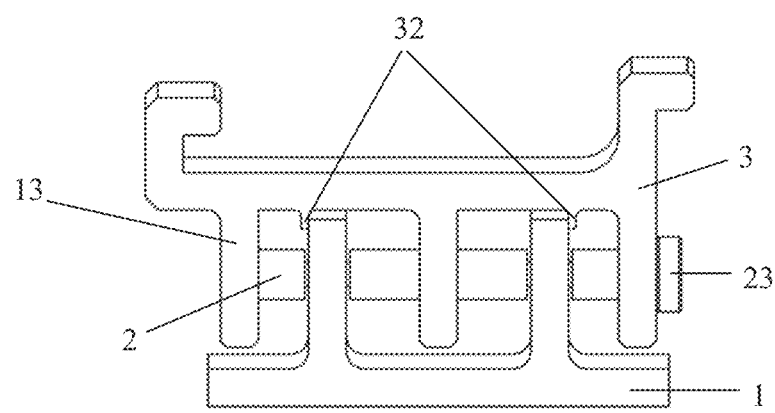
FIG. 2 is a schematic diagram of the anti thermal mismatch connecting device observed along the direction A in FIG. 1.

An anti thermal mismatch connecting device is shown in FIG. 1 and FIG. 2. FIG. 1 and FIG. 2 specifically show a CMC turbine outer annular component 1, a connector 2 and a metal intermediate casing 3.

Additionally, FIG. 1 and FIG. 2 also show CMC connecting holes 11, metal connecting holes 31, outer convex annular rib plates 12, inner convex annular rib plates 13, limit rings 32 and a cap part 23 of the connector 2. FIG. 1 and FIG. 2 only show a part of the CMC turbine outer annular component 1 and metal intermediate casing 3, cut along a radial direction of the turbine. The outer convex annular rib plates 12 and the inner convex annular rib plates 13 are both annular parts around the center of the turbine.

The CMC turbine outer annular component 1 provides two outer convex annular rib plates 12, and the metal intermediate casing 3 provides three inner convex annular rib plates 13. The two outer convex annular rib plates 12 and the three inner convex annular rib plates 13 are staggered along an axial direction of the engine, so that any one of the two outer convex annular rib plates 12 is located between two of the inner convex annular rib plates 13. The connection configuration shown in FIG. 1 and FIG. 2 provides a plurality of connecting points connected by the connector 2 to provide a uniform and reliable connection. The metal intermediate casing 3 provides two limit rings 32, which can be continuous annular structures or a plurality of support points distributed along the metal intermediate casing 3. The two outer convex annular rib plates 12 are located between the two limit rings 32, and the outer edges of the two outer convex annular rib plates 12 respectively abut against an adjacent limit ring 32, thereby limiting the degree of freedom of the CMC turbine outer annular component 1 in the axial direction of the engine. The limit rings 32 can also be placed at other positions on the metal intermediate casing 3 in other geometric forms. It only needs to play an axial limiting and positioning role for the CMC turbine outer annular component 1.

Figure 3:
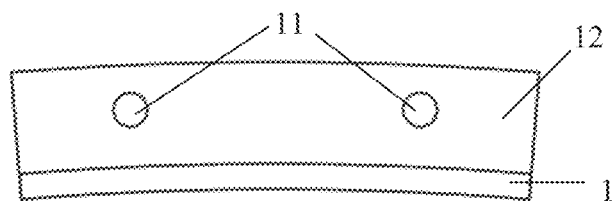
FIG. 3 is a structural diagram of a CMC turbine outer annular component.

FIG. 3 shows a structural diagram of the CMC turbine outer annular component 1. The CMC connecting holes 11 on the outer convex annular rib plates 12 on the CMC turbine outer annular component 1 are all round holes.

Figure 4:
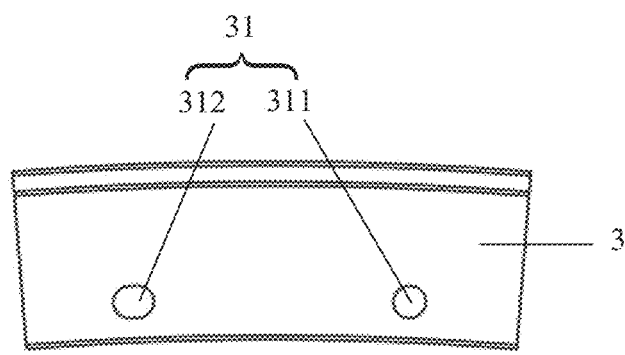
FIG. 4 is a structural diagram of the metal intermediate casing.

FIG. 4 shows a schematic diagram of the structure of the metal intermediate casing 3. The metal intermediate casing 3 provides a plurality of inner convex annular rib plates 13. As shown in FIG. 1, for each connector 2, the plurality of the inner convex annular rib plates 13 respectively provide metal connecting holes 31, which form a group and can be passed through by the metal connector 2. Therefore, a plurality of groups of the metal connecting holes 31 are distributed along the whole circumference of the metal intermediate casing 3. However, in FIG. 1 to FIG. 4, only two groups of the metal connecting holes 31 are shown. In one preferred embodiment, one group of the metal connecting holes 31 are round holes 311, and the other groups of the metal connecting holes 31 are runway shaped connecting holes 312.

Figure 5:
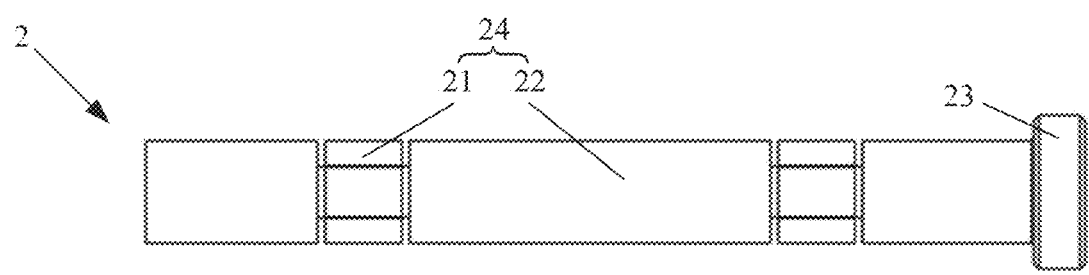
FIG. 5 is a schematic diagram of a first embodiment of the connector.
Figure 6:
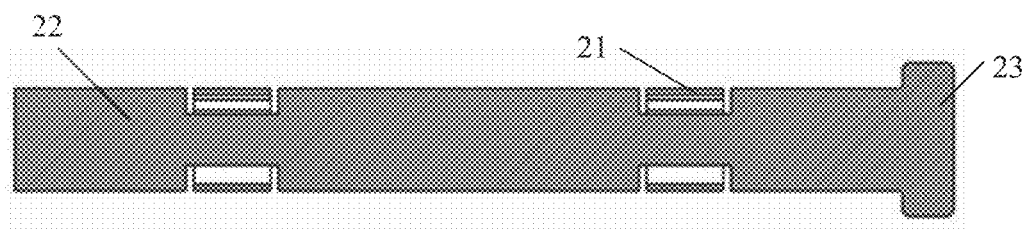
FIG. 6 is a sectional view of a first embodiment of the connector.

FIG. 5 and FIG. 6 show a first embodiment of the connector 2, which has an integrated processing structure. The connector 2 comprises a rod part 24. In one example, the connector 2 also comprises a cap part 23, which is used to limit an axial degree of freedom of the connector 2. In another example, the axial degree of freedom of the connector 2 is not limited by the cap part, but is limited and fixed by a feature of screw fit nut, or a form of end butting with adjacent parts. The rod part 24 comprises a subtractive hollow section 21 and a cylindrical section 22. The cylindrical section 22 can be hollow or solid.

In the first embodiment of the connector 2, the integrated processing structure is suitable to be processed and produced by a processing method such as precision casting or 3D printing.

Figure 7:
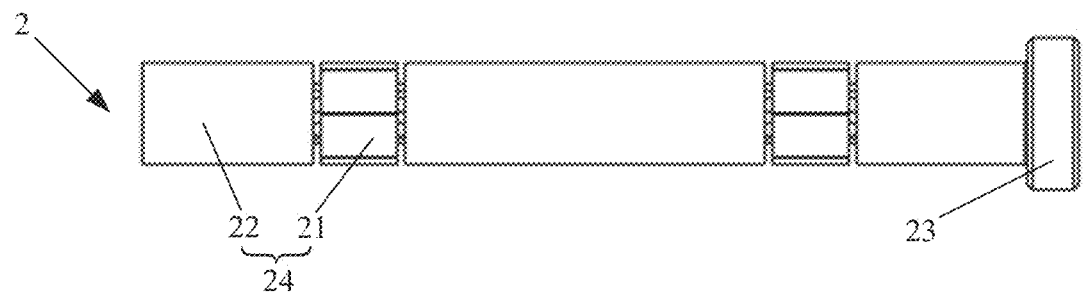
FIG. 7 is a schematic diagram of a second embodiment of the connector.
Figure 8:
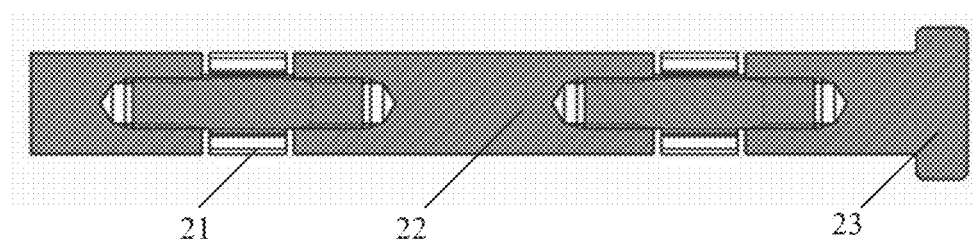
FIG. 8 is a sectional view of a second embodiment of the connector.

FIG. 7 and FIG. 8 show a second embodiment of the connector 2, which has a segmented processing structure. The subtractive hollow section 21 and the cylindrical section 22 are produced by separate processing, and the subtractive hollow section 21 can also be processed by a processing method such as wire cutting with high speed and low cost. The adjacent subtractive hollow section 21 and the cylindrical section 22 can be connected by a threaded connection structure shown in FIG. 8, or by welding.

Figure 9:
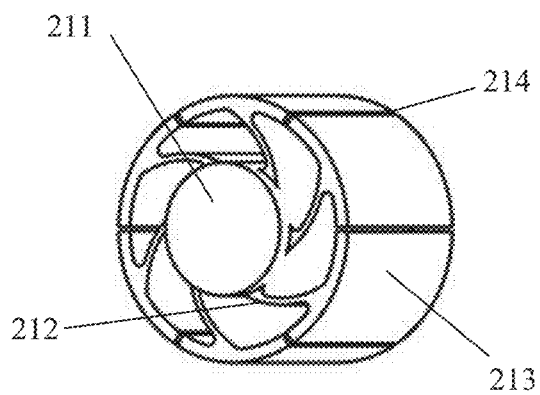
FIG. 9 is a stereoscopic view of the subtractive hollow section of the connector.
Figure 10:
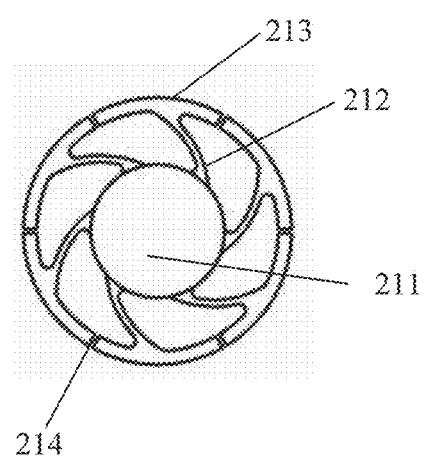
FIG. 10 is a side view of the subtractive hollow section of the connector.

FIG. 9 and FIG. 10 show the detailed structural features of the subtractive hollow section 21 of the connector 2. The subtractive hollow section 21 comprises a central shaft 211, a plurality of supporting rib plates 212, a plurality of outer annular plates 213 and a plurality of circumferential gaps 214. The supporting rib plates 212 extends outwards from a peripheral surface of the central shaft 211 and is inclined radially to the central shaft 211, for example, extends in a spiral shape and is rotationally symmetrical along the central shaft 211. The outer annular plates 213 are arranged around the central shaft 211, with a circumferential gap 214 between adjacent outer annular plates 213. The supporting rib plates 212 are connected with the central shaft 211 and the outer annular plates 213, and the central shaft 211 and the cylindrical section 22 on the connector 2 are connected by a threaded connection structure or welded. The diameter of the peripheral surface of the central shaft 211, the extended shape, radial dimension and quantity of the supporting rib plates 212, the cross-sectional shape, surface diameter and quantity of the outer annular plates 213, and the shape, width and quantity of the circumferential gaps 214 can be changed according to the structural design, without maintaining a fixed corresponding relationship with the diameter of the cylindrical section 22. The dimension relationship to be ensured is that the surface of the outer annular plates 213 and the inner circumferential surface of the CMC connecting holes 11 should be closely attached and generate a certain contact force under a room temperature installation state. Generally, the numbers of the supporting rib plates 212, the outer annular plates 213 and the circumferential gaps 214 is the same.

The following describes the installation process in combination with FIG. 1 and FIG. 2. Firstly, the CMC turbine outer annular component 1 and the metal intermediate casing 3 are assembled. The CMC turbine outer annular component 1 provides two outer convex annular rib plates 12, and the metal intermediate casing 3 provides three inner convex annular rib plates 13. The two outer convex annular rib plates 12 and the three inner convex annular rib plates 13 are staggered along the axial direction of the engine, so that any one of the two outer convex annular rib plates 12 is located between two of the inner convex annular rib plates 13. The metal intermediate casing 3 also provides two limit rings 32. Two outer convex annular rib plates 12 on CMC turbine outer annular component 1 are located between the two limit rings 32, and the outer edges of the two outer convex annular rib plates 12 respectively abut against an adjacent limit ring 32, thereby limiting the degree of freedom of the CMC turbine outer annular component 1 in the axial direction of the engine.

In the room temperature installation state, the connectors 2 are alternately passed through the metal connecting holes 31 on the metal intermediate casing 3 and the CMC connecting holes 11 on the CMC turbine outer annular component 1, to install and fix the CMC turbine outer annular component 1 and the metal intermediate casing 3.

The rod part 24 of the connector 2 comprises a subtractive hollow section 21 and a cylindrical section 22. The cylindrical section 22 is connected with the central shaft 211 of the subtractive hollow section 21 by threaded connection or welding.

The outer surfaces of the subtractive hollow section 21 of the connector 2, are fitted with the CMC connecting holes 11 on the outer convex annular rib plate 12, so that the surfaces of the plurality of the outer annular plates 213, arranged around the central shaft 211 on the subtractive hollow section 21, are closely attached with the inner circumferential surfaces of the CMC connecting holes 11, and a certain contact force and an installation preload are generated, which can avoid the vibration and collision problems caused by a reserved assembly gap. A plurality of supporting rib plates 212, extending outwards from the peripheral surface of the central shaft 211 and inclined radially relative to the central shaft 211, are arranged between the outer annular plates 213 and the central shaft 211, and a plurality of circumferential gaps 214 are provided between adjacent outer annular plates 213. Generally, the numbers of the supporting rib plates 212, the outer annular plates 213 and the circumferential gaps 214 are the same. In the process of temperature rising, the thermal expansion of the CMC turbine outer annular component 1 is different from that of the connector 2 and the metal intermediate casing 3, while the outer surface of the subtractive hollow section 21 on the connector 2 has smaller radial deformation stiffness when it contacts with the CMC connecting hole 11, and is prone to radial elastic deformation. This allows the expansion deformation of the outer surface of the subtractive hollow section 21, is easily limited by the inner circumferential surfaces of the CMC connecting holes 11 during the heating process. Meanwhile, there will be no great contact stress between the two. Therefore, the thermal deformation mismatch during the heating process, between the two, is alleviated, and the strength failure of the structure is avoided. At the same time, the existence of the subtractive hollow section 21 will not significantly reduce the overall deformation stiffness of the connector, thereby ensuring the overall stiffness of the whole anti thermal mismatch connecting device to meet the design needs.

The outer surface of the cylindrical section 22 of the connector 2 is closely matched with the metal connecting hole 31 on the inner convex annular rib plate 13. A kind of round hole 311 of the metal connecting hole 31 is closely matched with the cylindrical section 22 on a first connector 2, which is used to realize the accurate installation and positioning of the CMC outer annular component 1. Another kind of raceway shaped connecting hole 312 of the metal connecting hole 31 is closely matched with the cylindrical section 22 on a second connector 2. The raceway shaped connecting hole 312 allows the second connector 2 to slide in a specified direction, thereby alleviating the mismatch problem of thermal deformation between the connector 2, which is completely limited and fixed by the CMC connection hole 11, and the metal connecting hole 31 on the metal intermediate casing 3.

By designing the connector 2 with the subtractive hollow section 21 and the anti thermal mismatch connecting device, the mechanical connection and installation of the CMC turbine outer annular component 1 on a gas turbine engine are realized, and the mismatch problem of thermal deformation of connection structure among the CMC turbine outer annular component, the metal intermediate casing and the connectors, is alleviated, thereby avoiding the problems of structural strength failure or structural relaxation caused by high thermal mismatch deformation, and the problems of vibration and collision caused by a reserved gap, which is of great value for the engineering application of the CMC turbine outer annular component.

Although the disclosure is disclosed in a better embodiment as above, it is not intended to limit the disclosure. Those skilled in the art can make possible changes and modifications without departing from the spirit and scope of the disclosure. Therefore, all amendments, equivalent changes and modifications made to the above embodiments according to the technical essence of the disclosure, without departing from the content of the technical scheme of the disclosure, fall into the scope of protection defined by the claims of the disclosure.

The invention claimed is:

1. A connector, comprising a rod part, wherein the rod part comprises a subtractive hollow section and a cylindrical section, and the subtractive hollow section comprises:
   a central shaft;
   a plurality of supporting rib plates, extending outwards from a peripheral surface of the central shaft and inclined radially relative to the central shaft; and
   a plurality of outer annular plates, arranged around the central shaft, with a circumferential gap between adjacent outer annular plates;
   wherein the supporting rib plate is connected with the central shaft and the outer annular plate, and the central shaft is connected with the cylindrical section.

2. The connector of claim 1, wherein the plurality of supporting rib plates are arranged in a rotationally symmetric form along the central shaft.

3. The connector of claim 1, wherein the central shaft and the cylindrical section are connected or welded by a threaded connection structure.

4. The connector of claim 1, wherein outer surfaces of the plurality of the outer annular plates are located on a same cylindrical surface, and the cylindrical surface is located in an axial extension direction of an outer surface of the cylindrical section.

5. An anti thermal mismatch connecting device, comprising:
   a connector of claim 4, wherein the connector is metal;
   a CMC turbine outer annular component, with an outer convex annular rib plate at an outer circumference;
   a metal intermediate casing, with an inner convex annular rib plate at an inner circumference;
   wherein the outer convex annular rib plate has a CMC connecting hole, and the inner convex annular rib plate has a metal connecting hole;
   the cylindrical section of the connector is matched with the metal connecting hole of the inner convex annular rib plate;
   the subtractive hollow section of the connector is inserted into the CMC connecting hole, and the plurality of the outer annular plates are matched with the CMC connecting hole in a close contact, to generate an installation preload on the supporting rib plate.

6. The connecting device of claim 5, wherein the metal intermediate casing provides two limit rings; the CMC turbine outer annular component provides two outer convex annular rib plates, the two outer convex annular rib plates are located between the two limit rings, and outer edges of the two outer convex annular rib plates are respectively abutted on the adjacent limit ring.

7. The connecting device of claim 6, wherein the metal intermediate casing provides three inner convex annular rib plates, the two outer convex annular rib plates and the three inner convex annular rib plates are staggered along an axial direction of an engine, to make any one of the two outer convex annular rib plates located between two inner convex annular rib plates.

8. The connecting device of claim 5, wherein the metal intermediate casing provides a plurality of the inner convex annular rib plates, the metal connecting holes of the plurality of the inner convex annular rib plates, which are matched with one of the connector, are round holes, and rest of the metal connecting holes are runway shaped connecting holes.

* * * * *